United States Patent
Hirose

(10) Patent No.: US 11,371,936 B2
(45) Date of Patent: Jun. 28, 2022

(54) MULTI-WAVELENGTH LIGHT RADIATING APPARATUS

(71) Applicant: NATIONAL UNIVERSITY CORPORATION TOYOHASHI UNIVERSITY OF TECHNOLOGY, Toyohashi (JP)

(72) Inventor: Yuu Hirose, Toyohashi (JP)

(73) Assignee: NATIONAL UNIVERSITY CORPORATION TOYOHASHI UNIVERSITY OF TECHNOLOGY, Toyohashi (JP)

( * ) Notice: Subject to any disclaimer, the term of this patent is extended or adjusted under 35 U.S.C. 154(b) by 507 days.

(21) Appl. No.: 16/500,524

(22) PCT Filed: Apr. 4, 2018

(86) PCT No.: PCT/JP2018/014454
§ 371 (c)(1),
(2) Date: Dec. 11, 2019

(87) PCT Pub. No.: WO2018/186448
PCT Pub. Date: Oct. 11, 2018

(65) Prior Publication Data
US 2020/0110028 A1    Apr. 9, 2020

(30) Foreign Application Priority Data
Apr. 4, 2017 (JP) .............................. JP2017-074637

(51) Int. Cl.
*G01N 21/63* (2006.01)
*G01N 21/03* (2006.01)
*G02B 6/42* (2006.01)

(52) U.S. Cl.
CPC ............. *G01N 21/63* (2013.01); *G01N 21/03* (2013.01); *G02B 6/4215* (2013.01); *G01N 2201/0453* (2013.01); *G01N 2201/0635* (2013.01)

(58) Field of Classification Search
CPC ........... G01J 3/10; G01N 21/03; G01N 21/63; G01N 2201/0453; G01N 2201/0635;
(Continued)

(56) References Cited

U.S. PATENT DOCUMENTS

| 4,566,792 A | * | 1/1986 | Suzuki | ................ | G01N 21/253 356/319 |
| 4,950,077 A | * | 8/1990 | Manabe | ............... | G01N 21/253 356/328 |

(Continued)

FOREIGN PATENT DOCUMENTS

| JP | H01162648 U | 11/1989 |
| JP | H0989667 A | 4/1997 |

(Continued)

OTHER PUBLICATIONS

English translation of International Preliminary Report on Patentability for parent application No. PCT/JP2018/014454 dated Sep. 3, 2019.

(Continued)

*Primary Examiner* — Sunghee Y Gray
(74) *Attorney, Agent, or Firm* — J-TEK Law PLLC; Scott T. Wakeman

(57) ABSTRACT

A multiwavelength-light-radiating apparatus (1) includes: a light source (11) that radiates continuous light (Lc); a diffracting part (12) that diffracts the continuous light (Lc) into numerous monochromatic lights (Lm), whose wavelengths differ from one another, and emits the numerous monochromatic lights (Lm); numerous optical waveguides (2) that respectively transmit the numerous monochromatic lights (Lm) emitted from the diffracting part (12) from incident ends (21) to output ends (22) where the numerous monochromatic lights (Lm) are respectively emitted; and a sample-placement part (3) that holds numerous samples such that the output ends (22) of the numerous optical waveguides (2) respectively oppose the samples. The numerous monochromatic irradiation lights, whose wavelengths differ from one another, are arranged to be radiated (Continued)

simultaneously onto the numerous samples, one light per sample.

18 Claims, 6 Drawing Sheets

(58) Field of Classification Search
CPC .. G01N 21/01; G01N 21/0332; G01N 21/253; G01N 2201/0826; G02B 6/4215; G02B 6/4249; G02B 6/4292
USPC .......................................................... 435/436
See application file for complete search history.

(56) References Cited

U.S. PATENT DOCUMENTS

| | | |
|---|---|---|
| 7,733,488 B1 | 6/2010 | Johnson |
| 2004/0114211 A1* | 6/2004 | Trepagnier ............ G02F 1/3532 359/328 |
| 2010/0238431 A1 | 9/2010 | Johnson |
| 2011/0312102 A1* | 12/2011 | Jo ......................... G01J 3/0216 436/164 |
| 2012/0182556 A1 | 7/2012 | Praet |
| 2013/0228675 A1* | 9/2013 | Chen ...................... G01N 21/17 250/575 |

FOREIGN PATENT DOCUMENTS

| | | |
|---|---|---|
| JP | H11304693 A | 11/1999 |
| JP | 2002355246 A | 12/2002 |
| JP | 2011191081 A | 9/2011 |

OTHER PUBLICATIONS

English translation of the International Search Report dated Oct. 11, 2018 for parent application No. PCT/JP2018/014454.
Masakatsu Watanabe, 2001; "An Action Spectrum Measuring Method and a Large-Size Spectrograph"; ("Cell Technology Supplement, Plant Cell Technology, Series 16, Optical Sensing of Plants," pp. 171-175), with English translation.
Machine translation of rejections made in Written Opinion dated Oct. 11, 2018 for parent application No. PCT/JP2018/014454.

* cited by examiner

MULTI-WAVELENGTH LIGHT RADIATING APPARATUS

CROSS-REFERENCE

This application is the US national stage of International Patent Application No. PCT/JP2018/014454 filed on Apr. 4, 2018, which claims priority to Japanese Patent Application No. 2017-074637 filed on Apr. 4, 2017.

TECHNICAL FIELD

The present invention relates to a multiwavelength-light-radiating apparatus configured such that numerous monochromatic irradiation lights can be radiated simultaneously onto numerous samples, each light onto its corresponding sample.

BACKGROUND ART

Research called optogenetics (optogenetics), which controls physiological phenomena of organisms using light irradiation, has been conducted in recent years. Within that research, there is research being conducted to investigate the wavelength dependency of physiological responses of organisms to light. That is, there is an analysis technique (action spectrum analysis) that irradiates an organism with lights of various wavelengths and quantifies the physiological responses thereto. As a light-radiating apparatus that uses action spectrum analysis, there is, for example, the large-size spectrograph at the National Institute for Basic Biology, as introduced also in Non-Patent Document 1 below. That is, this large-size spectrograph can diffract white light of a white light source into numerous monochromatic lights that are different from one another and then simultaneously radiate each of the monochromatic lights onto samples of the organism, etc.

PRIOR ART LITERATURE

Non-Patent Documents

Non-Patent Document 1
By Masakatsu WATANABE, 2001; "An Action Spectrum Measuring Method and a Large-Size Spectrograph"; ("Cell Technology Supplement, Plant Cell Technology, Series 16, Optical Sensing of Plants," pp. 171-175)

SUMMARY OF THE INVENTION

Nevertheless, the above-mentioned large-size spectrograph is large equipment on the scale of approximately 10 m and therefore cannot easily be introduced into laboratories from the standpoints of size and cost. In addition, it cannot be said that it is necessarily a suitable apparatus for analyzing, for example, extremely minute, small quantities of samples such as cells of organisms.

In addition, a technique is also conceivable in which numerous monochromatic lights are respectively radiated onto samples using LEDs (light-emitting diodes); however, there is a limit to this technique from the viewpoint of wavelength resolving power, and it is problematic to sufficiently conduct detailed research into the action spectrum analysis described above.

The present invention was conceived against such background, and an object of the present invention is to provide a multiwavelength-light-radiating apparatus that is low cost and small in size.

One aspect of the present invention is a multiwavelength-light-radiating apparatus comprising:
a light source that radiates continuous light;
a diffracting part that diffracts the continuous light into numerous monochromatic lights, whose wavelengths differ from one another, and emits such;
numerous optical waveguides that individually introduce, from incident ends, the monochromatic lights emitted from the diffracting part and emit such, from output ends, as monochromatic irradiation lights; and
a sample-placement part in which numerous samples are placed opposing the output ends of the optical waveguides, each sample opposing its corresponding output end;
wherein the numerous monochromatic irradiation lights, whose wavelengths differ from one another, can be radiated simultaneously onto the numerous samples, each light onto its corresponding sample, placed in the above-mentioned sample-placement part.

The multiwavelength-light-radiating apparatus comprises the light source, the diffracting part, the numerous optical waveguides, and the sample-placement part. Thereby, the numerous monochromatic lights resulting from diffraction by the diffracting part can be guided, by the numerous optical waveguides, individually to the numerous samples placed in the sample-placement part and radiated as the monochromatic irradiation lights. Consequently, an apparatus that radiates the numerous monochromatic irradiation lights simultaneously onto the numerous samples, each light onto its corresponding sample, without using particularly large-size equipment, can be implemented at low cost.

In addition, because a light source that radiates continuous light is used as the light source and that continuous light is diffracted by the diffracting part, the wavelength resolving power of the monochromatic irradiation lights can be easily increased while the light intensities of the monochromatic irradiation lights are maintained.

According to the above-mentioned aspects as described above, a multiwavelength-light-radiating apparatus that is low cost and small in size can be provided.

MODES FOR CARRYING OUT THE INVENTION

Figure 1:
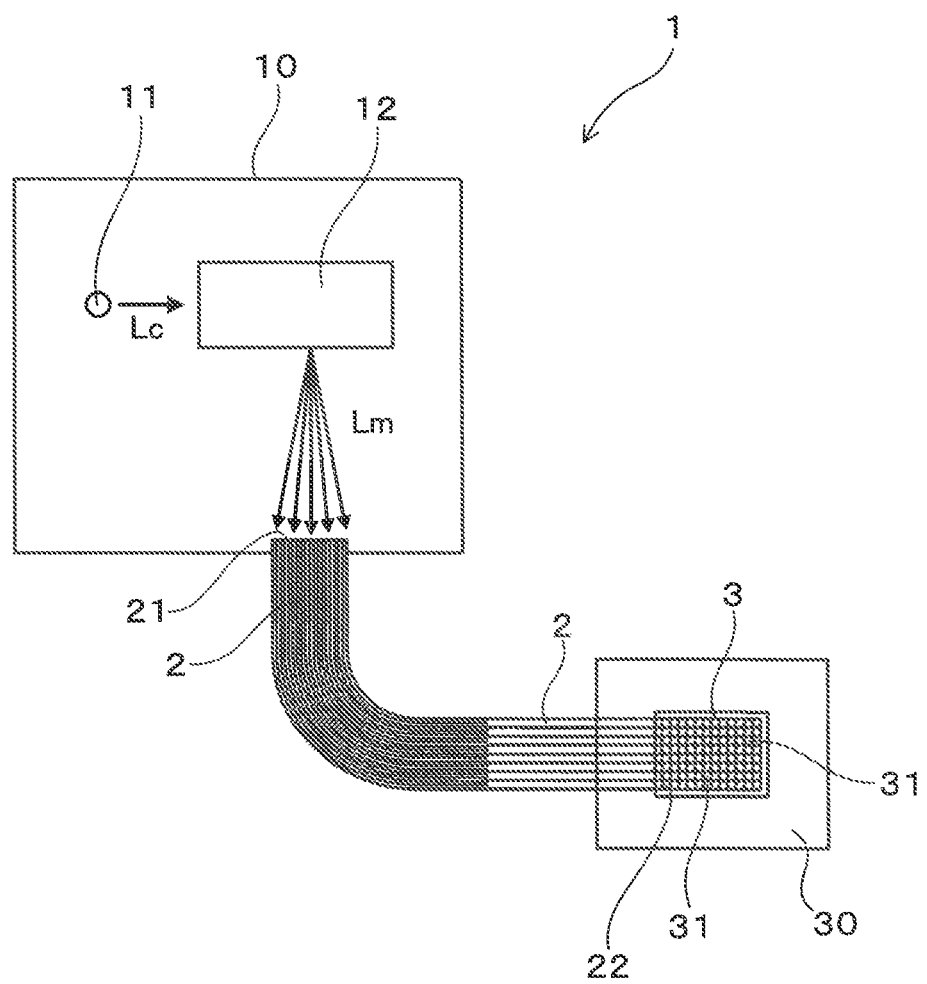
FIG. 1 is an explanatory plan view of a multiwavelength-light-radiating apparatus of a first embodiment.

The above-mentioned multiwavelength-light-radiating apparatus is configured such that, as described above, the numerous monochromatic irradiation lights, whose wavelengths differ from one another, can be radiated simultaneously onto numerous samples, each light onto its corresponding sample. Here, "numerous" in "numerous monochromatic irradiation lights" or the like is not particularly limited and means, for example, 5 or more, preferably 10 or more, and more preferably 20 or more. In addition, in the present specification, "monochromatic light" and "monochromatic irradiation light" do not mean light that is of a perfectly single wavelength but rather means light of a sufficiently narrow wavelength band.

In addition, with regard to "configured such that . . . can be radiated simultaneously," it is not necessarily required that the start time and the end time of the radiation be able to coincide perfectly; for example, it is acceptable if a deviation of approximately 0.1 s arises. Of course, a usage method is also possible in which the radiation times intentionally deviate from one another.

In addition, the sample, which is placed opposing the output end, is not limited to the situation in which it is placed opposingly such that the surface of the sample is orthogonal to an axial direction of the output end of the optical fiber. That is, the opposed-placement state is not particularly limited, as long as the monochromatic irradiation light emitted from the output end radiates to the sample. For example, the axial direction of the output end of the optical fiber may be tilted with respect to the surface of the sample.

In addition, although the optical waveguide preferably comprises an optical fiber, for example, a flexible, sheet-shaped optical waveguide can also be used. However, by virtue of the optical waveguide comprising an optical fiber, the multiwavelength-light-radiating apparatus can be obtained easily and reliably. In addition, the multiwavelength-light-radiating apparatus can be implemented much more compactly.

The sample-placement part comprises numerous wells, which are disposed opposing the output ends of the optical waveguides, each well opposing its corresponding output end; and the multiwavelength-light-radiating apparatus is configured such that the numerous monochromatic irradiation lights, whose wavelengths differ from one another, can be radiated simultaneously onto the samples, each light onto its corresponding sample, placed in the numerous wells. In this case, the numerous samples can be arrayed easily and with good accuracy, and thereby analysis of higher accuracy can be performed easily.

It is noted that, thereby, the multiwavelength-light-radiating apparatus can be configured in accordance with the aspects as follows.

That is, the multiwavelength-light-radiating apparatus can be configured such that it comprises:
a light source that radiates continuous light;
a diffracting part that diffracts the continuous light into numerous monochromatic lights, whose wavelengths differ from one another, and emits such;
numerous optical fibers, which introduce, from separate incident ends, the monochromatic lights emitted from the diffracting part and emit such, from the output ends, as the monochromatic irradiation lights; and
a sample-placement part comprising numerous wells disposed opposing the output ends of the optical fibers, each well opposing its corresponding output end;
wherein the multiwavelength-light-radiating apparatus is configured such that the numerous monochromatic irradiation lights, whose wavelengths differ from one another, can be radiated simultaneously onto samples placed in each of the numerous wells.

The full width at half maximum of the monochromatic irradiation lights is preferably 20 nm or less. In this case, wavelength purity and wavelength resolving power can be increased, and the numerous monochromatic irradiation lights, which are of finely resolved wavelengths, can be obtained with high purity. Thereby, for example, the action spectrum analysis described above can be performed more effectively using the multiwavelength-light-radiating apparatus.

The full width at half maximum of the monochromatic irradiation lights is more preferably 10 nm or less, and the full width at half maximum of the monochromatic irradiation lights is yet more preferably 5 nm or less.

In addition, the spacing of the peak wavelengths of the numerous monochromatic irradiation lights is preferably 20 nm or less. In this case, the numerous monochromatic irradiation lights, which are of finely resolved wavelengths, can be obtained efficiently. Thereby, by using the above-mentioned multiwavelength-light-radiating apparatus, for example, the action spectrum analysis described above can be performed more effectively.

The spacing of the peak wavelengths of the monochromatic irradiation lights is more preferably 10 nm or less, and the spacing of the peak wavelengths of the monochromatic irradiation lights is yet more preferably 5 nm or less.

In addition, the light source is configured to radiate continuous light that includes at least a portion of the visible light region, and at least some of the numerous monochromatic irradiation lights are preferably monochromatic lights in the visible light region. In this case, the multiwavelength-light-radiating apparatus can be suitably used in, for example, action spectrum analysis in optogenetics and the like, which was described above.

In addition, the light source can also be one that is configured to radiate continuous light that includes the entire visible light region. In this case, the multiwavelength-light-radiating apparatus can be much more suitably used in, for example, action spectrum analysis in optogenetics and the like, which was described above.

In addition, adjusting filters that adjust the light intensities of the monochromatic irradiation lights are preferably interposed between the output ends of the optical waveguides and the wells. In such an embodiment, the light intensities of the monochromatic irradiation lights that are radiated onto the numerous samples can be adjusted. Thereby, adjustments can be made such as uniformizing, among the samples, light irradiation conditions other than wavelength, such as the light intensity itself or the energy per unit of time.

In addition, it is preferable to further have a positioning member that both holds the numerous optical waveguides in the vicinity of the output ends and positions the output ends and the wells. In this case, it is possible to make it easy to accurately radiate the monochromatic irradiation lights onto the samples in the numerous wells of the sample-placement part.

In addition, the positioning member preferably comprises light-shielding parts for ensuring that the plurality of monochromatic irradiation lights emitted from the plurality of output ends do not intermix. In this case, a single monochromatic irradiation light can be reliably radiated to the sample disposed in a single well.

In addition, the sample-placement part is preferably configured such that the monochromatic irradiation light radiated onto each well does not leak to other wells. In this case, it is possible to reliably prevent the monochromatic irradiation light radiated onto each well from affecting samples disposed in different wells.

In addition, the numerous optical waveguides are preferably arranged such that the incident ends are arrayed in one row in a straight line, and the output ends are arrayed in a plurality of rows. In this case, each monochromatic light, resulting from diffraction in the diffracting part, can be easily caused to impinge its corresponding optical waveguide, and the monochromatic irradiation lights can be emitted as an array having a plurality of rows. Thereby, the numerous wells of the sample-placement part can be disposed in a plurality of rows.

In addition, the sample-placement part preferably comprises a temperature-adjusting part for adjusting the temperature of the samples inside the wells. In this case, the monochromatic irradiation lights can be radiated while the temperature of the samples is being adjusted.

In addition, the light intensities of the monochromatic irradiation lights are preferably 0.1-150 $\mu mols^{-1}m^{-2}$ (i.e., 0.1-150 $\mu Es^{-1}m^{-2}$). In this case, the monochromatic irradiation lights can be radiated onto the samples with sufficient light intensities.

First Embodiment

An embodiment of the multiwavelength-light-radiating apparatus will be explained, with reference to FIG. 1 to FIG. 8.

Figure 2:
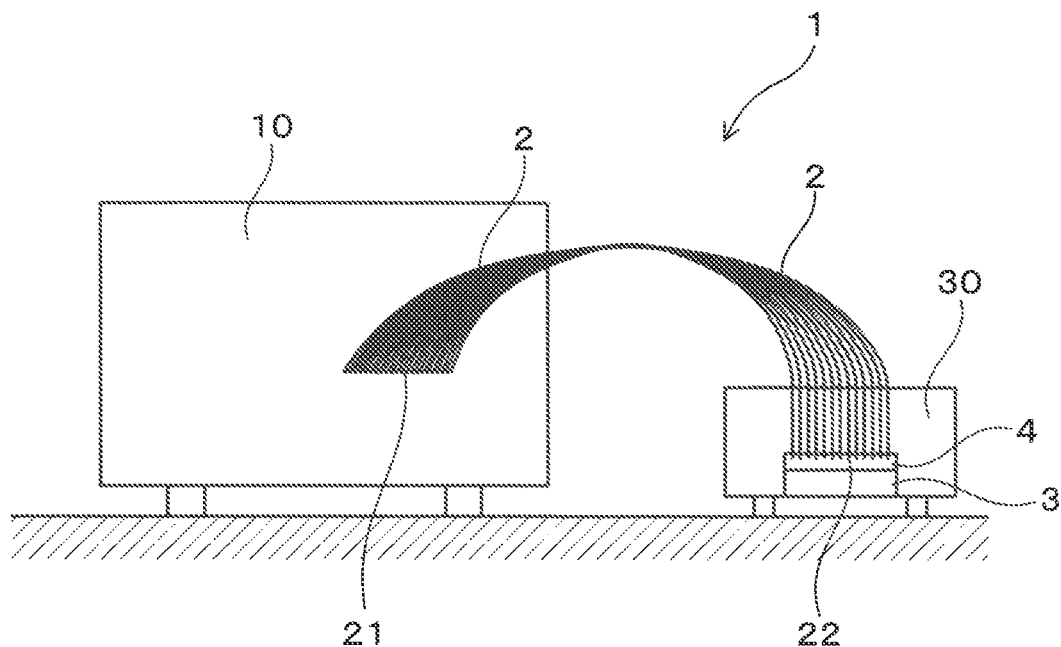
FIG. 2 is an explanatory side view of the multiwavelength-light-radiating apparatus of the first embodiment.

A multiwavelength-light-radiating apparatus 1 of the present embodiment comprises a light source 11, a diffracting part 12, numerous optical fibers 2, and a sample-placement part 3, as shown in FIG. 1 and FIG. 2.

The light source 11 radiates continuous light Lc. The diffracting part 12 diffracts the continuous light Lc into numerous monochromatic lights Lm, whose wavelengths differ from one another, and emits such. With regard to the optical fibers 2, the monochromatic lights Lm emitted from the diffracting part 12 are individually introduced from incident ends 21 and emitted as monochromatic irradiation lights Li from output ends 22.

As shown in FIG. 4 to FIG. 7, the sample-placement part 3 comprises numerous wells 31, which are disposed opposing the output ends 22 of the corresponding optical fibers 2, each well opposing its corresponding output end.

The multiwavelength-light-radiating apparatus 1 is configured such that the numerous monochromatic irradiation lights Li, whose wavelengths differ from one another, can be simultaneously radiated onto samples s placed in each of the numerous wells 31.

The light source 11 radiates the continuous light Lc, which includes at least a portion of the visible light region. In particular, in the present embodiment, continuous light Lc that includes the entire visible light region is radiated. The continuous light Lc can be, for example, a continuous spectrum across the wavelength region of 300-800 nm. In addition, a xenon lamp can be used as the light source 11. However, the light source 11 is not limited to a xenon lamp, and, for example, a halogen lamp, a mercury lamp, or the like can also be used.

Figure 3:
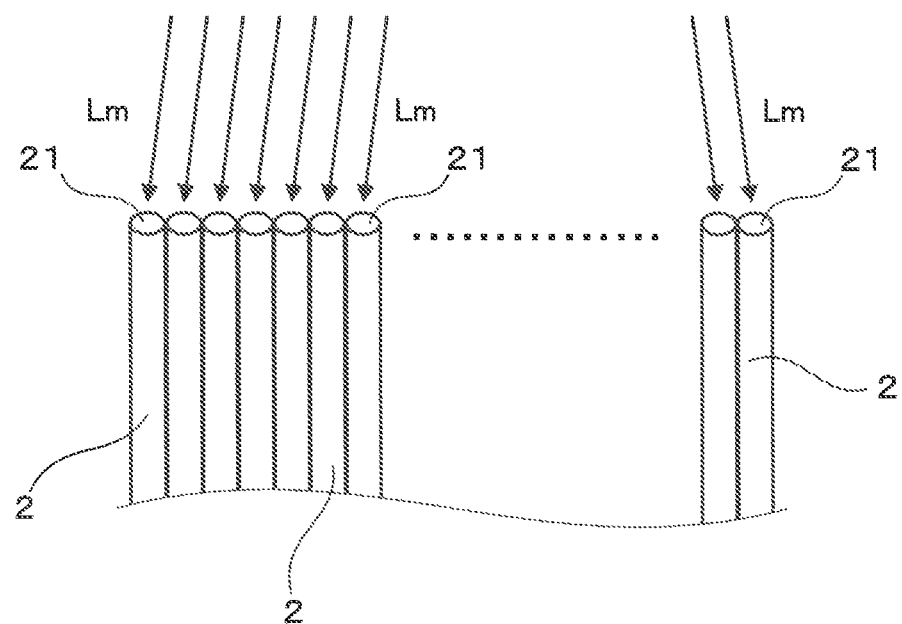
FIG. 3 is an explanatory oblique view of incident ends of numerous optical fibers of the first embodiment.

The diffracting part 12 can be configured using, for example, a diffraction grating, a collimating mirror, or the like, although not shown. Furthermore, the continuous light Lc is diffracted in the diffracting part 12, and, as shown in FIG. 1 and FIG. 3, the numerous monochromatic lights Lm are emitted from the diffracting part 12 such that they spread in a straight line. Furthermore, the monochromatic lights Lm travel toward the incident ends 21 of the numerous optical fibers 2, which are disposed arranged in a straight line. In the present embodiment, the diffracting part 12 diffracts into 96 monochromatic lights Lm, whose wavelengths differ from one another, and emits such. That is, for example, the 96 monochromatic lights Lm, whose wavelengths from the monochromatic light Lm having a wavelength of 300 nm to the monochromatic light Lm having a wavelength of 800 nm are shifted from one another little by little, are emitted from the output ends 22.

In correspondence therewith, 96 of the optical fibers 2 are disposed, and the incident ends 21 of the 96 optical fibers 2 are disposed in a straight line, opposing the diffracting part 12.

As shown in FIG. 1 and FIG. 2, the multiwavelength-light-radiating apparatus 1 comprises a main-body part 10 in which the light source 11 and the diffracting part 12 are disposed in a single casing. The 96 optical fibers 2 are connected, on the incident ends 21 side, to the main-body part 10.

The sample-placement part 3 is provided on the output ends 22 side of the numerous optical fibers 2. The sample-placement part 3 is disposed within a casing that is separate from the main-body part 10. That is, in the present embodiment, the multiwavelength-light-radiating apparatus 1 comprises: the main-body part 10, which comprises the light source 11 and the diffracting part 12; a sample part 30, which comprises the sample-placement part 3; and the numerous optical fibers 2, which connect both.

Figure 5:
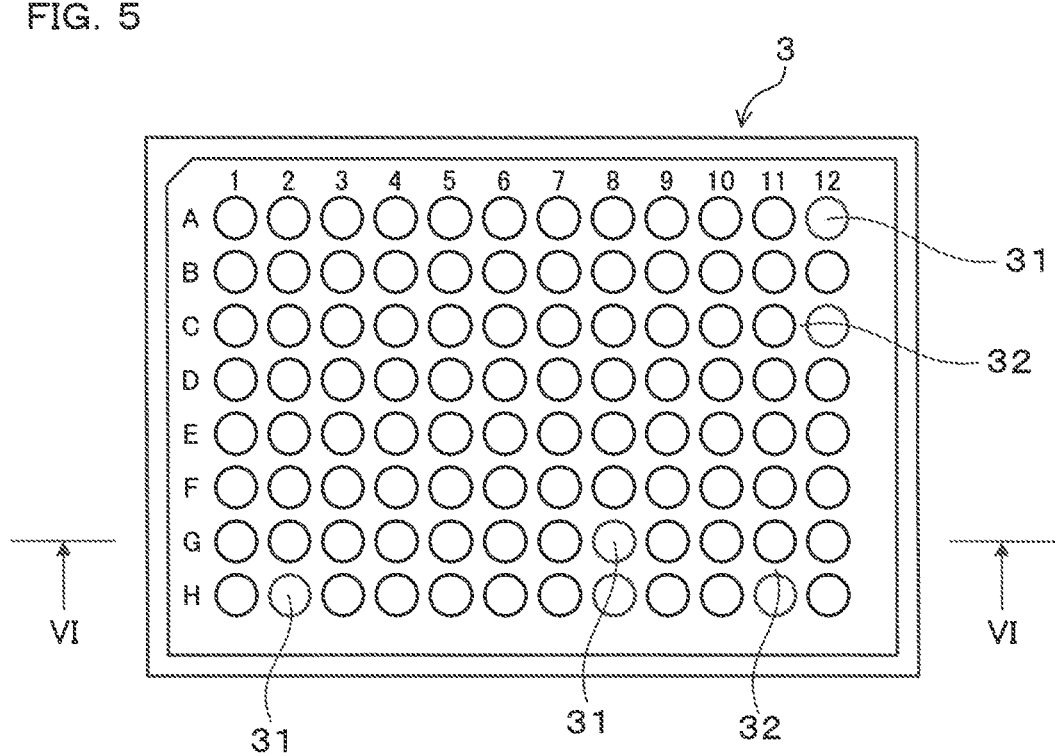
FIG. 5 is a plan view of the sample-placement part of the first embodiment.
Figure 6:
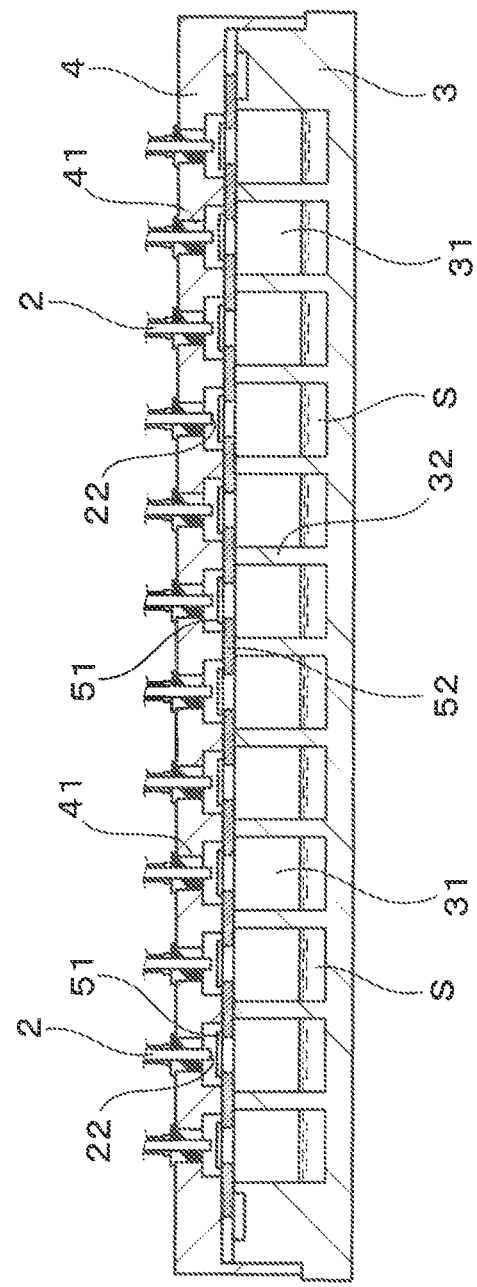
FIG. 6 is a cross-sectional view of the surroundings of the sample-placement part, corresponding to an auxiliary cross-sectional view taken along line VI-VI in FIG. 5, of the first embodiment.

As described above, the incident ends 21 of the numerous optical fibers 2 are arrayed in one row in a straight line. On the other hand, the numerous optical fibers 2 are disposed such that the output ends 22 are arrayed in a plurality of rows. As shown in FIG. 6, the numerous wells 31 in the sample-placement part 3, which the output ends 22 oppose, are arrayed in a plurality of rows, as shown in FIG. 5. In correspondence with this array, the numerous optical fibers 2 are arranged such that the output ends 22 are arrayed in a plurality of rows.

Figure 4:
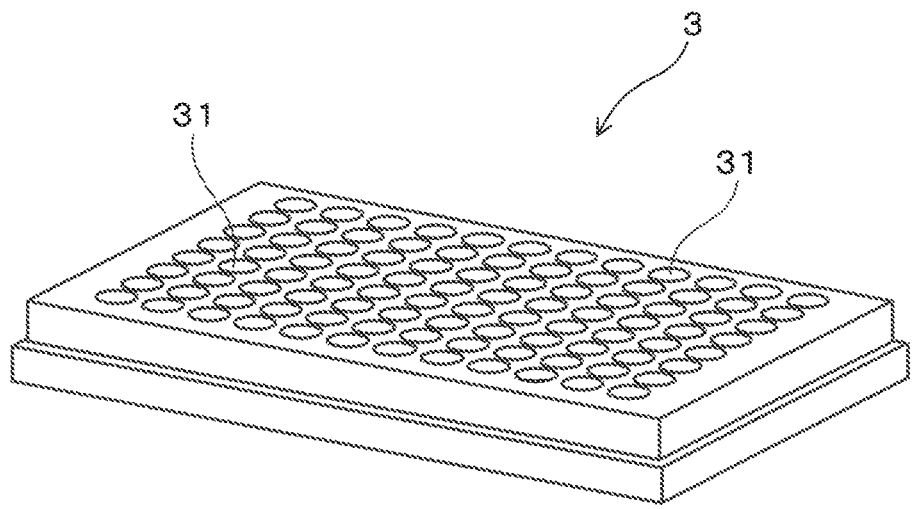
FIG. 4 is an oblique view of a sample-placement part of the first embodiment.

As shown in FIG. 5, the sample-placement part 3 is provided with an array in which eight rows of the wells 31, each row having twelve wells 31 lined up transversely, are arranged longitudinally. As shown in FIG. 4 to FIG. 6, the sample-placement part 3 is composed of a tray-shaped member, wherein numerous recessed parts are formed as the wells 31. As shown in FIG. 4 to FIG. 7, the numerous wells 31 all have the same shape and the same size, and the shape of each of the wells 31 is substantially a circular-columnar shape.

The sample-placement part 3 is configured such that the monochromatic irradiation light Li radiated onto each of the wells 31 does not leak to other wells 31. Specifically, the sample-placement part 3 is composed of a black resin-molded body. Furthermore, a configuration is used such that the monochromatic irradiation lights Li do not transmit between the wells 31.

Figure 7:
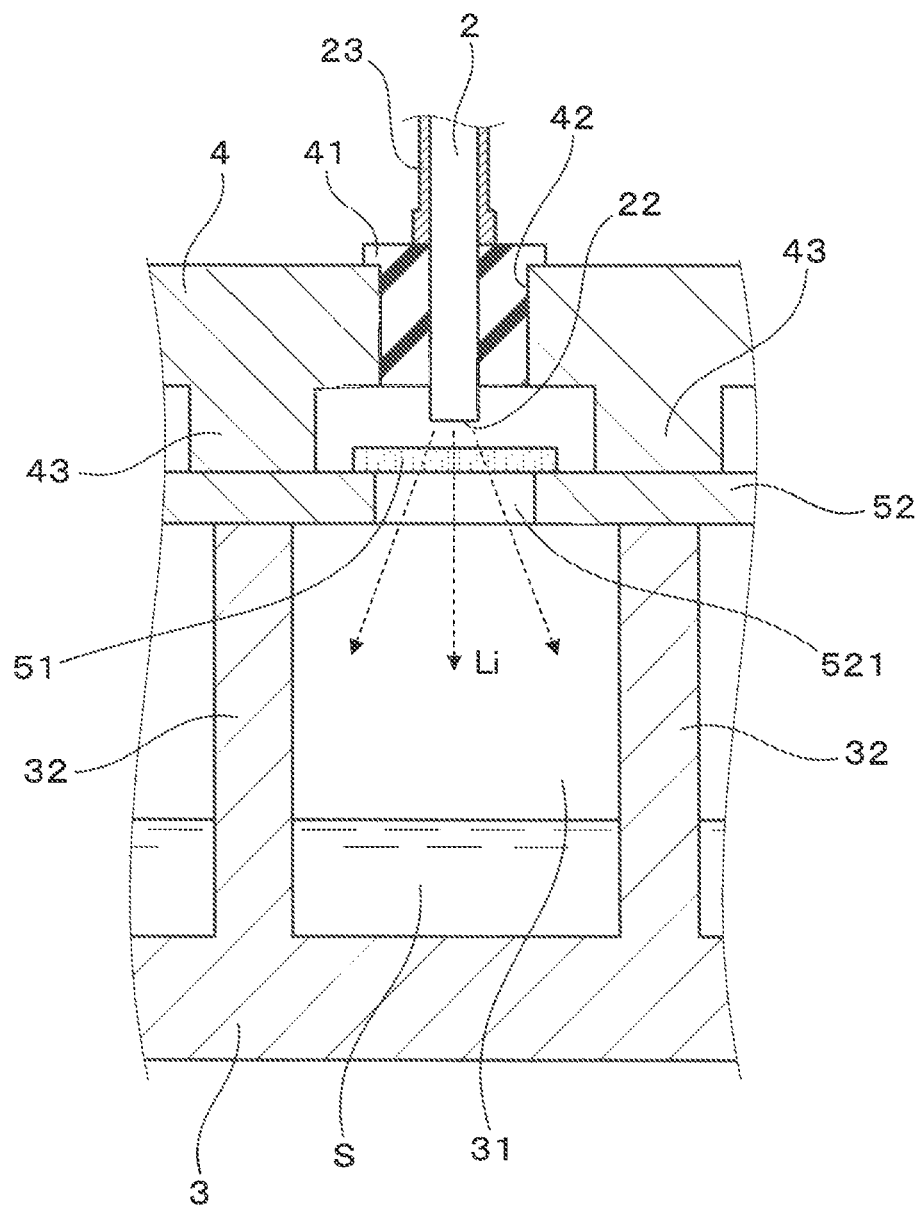
FIG. 7 is a cross-sectional view of the surroundings of a well of the sample-placement part of the first embodiment.

As shown in FIG. 6 and FIG. 7, the output ends 22 of the optical fibers 2 oppose, from their opening sides (from above), the wells 31. A positioning member 4 is mounted on the sample-placement part 3. The positioning member 4 holds the numerous optical fibers 2 in the vicinity of the output ends 22 and positions the output ends 22 and the wells 31.

The positioning member 4 is disposed on and fixed to an upper side of the sample-placement part 3. The positioning member 4 comprises insertion-holding parts 41, in correspondence with the numerous wells 31 of the sample-placement part 3, through which the optical fibers 2 are inserted and held. Each insertion-holding part 41 is composed of an elastic member, such as rubber, and is tightly adhered to an outer-circumferential surface of its corresponding optical fiber 2 in the vicinity of the output end 22. In addition, each insertion-holding part 41 is tightly adhered to an inner-circumferential surface of a corresponding opening hole 42 provided in a main-body part of the positioning member 4.

Thus, the output end 22 of each optical fiber 2 is positioned, by the positioning member 4 relative to its corresponding well 31 of the sample-placement part 3, in the spreading direction (horizontal direction) and the opening direction (vertical direction). It is noted that the optical fibers 2 are attachably and detachably held by the positioning member 4. Thereby, a configuration is used such that the numerous optical fibers 2 can be rearranged with respect to the numerous wells 31 of the sample-placement part 3. In addition, a metal tube 23, which is composed of stainless steel, is provided on the outer circumference of each optical fiber 2 in a portion of the vicinity of the output end 22. The optical fiber 2 protrudes from the metal tube 23 on the output end 22 side, and this protruded portion is held by the insertion-holding part 41.

In addition, adjusting filters 51, which adjust the light intensities of the monochromatic irradiation lights Li, are provided interposed between the output ends 22 of the optical fibers 2 and the corresponding wells 31. The adjusting filters 51 are, for example, ND (neutral density) filters and are ones that reduce the light intensities of the transmitted lights by prescribed percentages, without affecting the wavelengths.

The adjusting filters 51 are mounted on openings 521 of a filter mount board 52. The numerous openings 521 are formed, in correspondence with the numerous wells 31 of the sample-placement part 3, in the filter mount board 52. The filter mount board 52 is provided in the state in which it is interposed between and held by the sample-placement part 3 and the positioning member 4.

The adjusting filters 51 are affixed such that they close up the openings 521 of the filter mount board 52. In addition, the adjusting filters 51 are attachably and detachably mounted on the filter mount board 52. In addition, the adjusting filters 51 are configured such that they can be individually mounted on each opening 521. That is, a configuration is used such that one adjusting filter 51 can be disposed per output end 22 of the numerous optical fibers 2.

Furthermore, the light intensities of the monochromatic irradiation lights Li emitted from the output ends 22 are individually adjusted by the adjusting filters 51. That is, adjusting filters 51 having a high attenuation ratio are disposed for monochromatic irradiation lights Li that have high light intensities prior to transmitting through the adjusting filters 51, and adjusting filters 51 having a small attenuation ratio are disposed for monochromatic irradiation lights Li having low light intensities prior to transmitting through the adjusting filters 51. Depending on the situation, there may be an optical fiber 2 or optical fibers 2 in which the adjusting filter(s) 51 is (are) not disposed opposing the output end 22.

In this way, they adjust the light intensities of the monochromatic irradiation lights Li after they have penetrated (or passed through) the adjusting filters 51 (or the openings 521), that is, the light intensities of the monochromatic irradiation lights Li radiated onto the samples s. Here, the light intensity of the monochromatic irradiation light Li means the number of photons per unit of time. In addition, unless otherwise specified, the light intensity of the monochromatic irradiation light Li means the intensity of the light radiated to the sample s. That is, unless otherwise specified, when the monochromatic irradiation light Li passes through the adjusting filter 51, the light intensity after passing therethrough is the light intensity of the monochromatic irradiation light Li.

By adjusting the light intensities of the monochromatic irradiation lights Li radiated onto the samples s, the light intensities themselves of the monochromatic irradiation lights Li radiated onto the samples s inside the numerous wells 31 may be equal, or may be equal to some other indicator such as the energy per unit of time. This is determined in accordance with the gist of the experiment to be performed using the multiwavelength-light-radiating apparatus 1.

In addition, the positioning member 4 comprises light-shielding parts 43, which are for ensuring that the plurality of monochromatic irradiation lights Li emitted from the plurality of output ends 22 do not intermix. That is, the light-shielding parts 43 are provided on outer-circumference sides of the output ends 22 of the optical fibers 2. The output ends 22 of the optical fibers 2 are disposed in spaces that are enclosed by the light-shielding parts 43. Lower ends of the light-shielding parts 43 make contact with an upper surface of the filter mount board 52. It is noted that a lower surface of the filter mount board 52 makes contact with upper ends of partitions 32 of the sample-placement part 3. In addition, the same as in the sample-placement part 3, the positioning member 4, which includes the light-shielding parts 43, and the filter mount board 52 are composed of a black member and are configured such that the monochromatic irradiation lights Li do not transmit therethrough.

According to such a configuration, monochromatic irradiation light Li emitted from an output end 22 of an optical fiber 2 does not mix with monochromatic irradiation lights Li emitted from adjacent output ends 22. Accordingly, the monochromatic irradiation light Li emitted from each output end 22 radiates only to the well 31 that that output end 22 opposes and is configured such that it does not leak into other wells 31.

Figure 8:
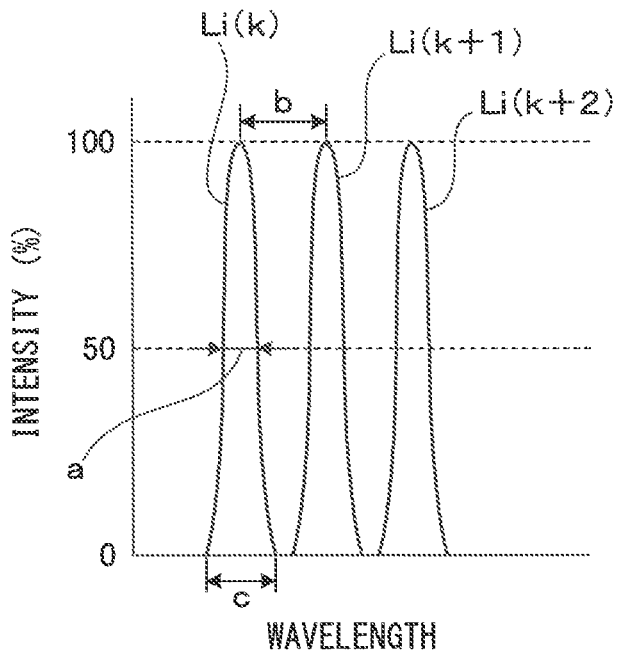
FIG. 8 is a line drawing of the wavelength characteristics of a plurality of monochromatic irradiation lights of the first embodiment.

FIG. 8 is a line drawing that shows the wavelength characteristics of some of the numerous monochromatic irradiation lights Li. Here, the wavelength characteristics are shown only for three monochromatic irradiation lights Li(k), Li(k+1), Li(k+2) of the 96 monochromatic irradiation lights Li. In the same drawing, the curves indicated by the symbols Li(k), Li(k+1), Li(k+2) indicate the wavelength characteristics of the monochromatic irradiation lights Li(k), Li(k+1), Li(k+2), respectively. However, these curves are schematic diagrams for explanation. Here, Li(k) means the $k^{th}$ monochromatic irradiation light Li, of the 96 monochromatic irradiation lights Li resulting from the diffraction, having the shortest wavelength. k is a natural number in the range of 1-94. In addition, in the graph of FIG. 8, the abscissa represents wavelength and the ordinate represents light intensity. The light intensity of the ordinate is a percentage, wherein the peak of the light intensity of the monochromatic irradiation light Li is set to 100%.

As shown in FIG. 8, the full width at half maximum a of each monochromatic irradiation light Li is 20 nm or less. In addition, the spacing b of the peak wavelengths of the numerous monochromatic irradiation lights Li is 20 nm or less. In the present embodiment, the full width at half maximum a is 5 nm or less and more specifically is approximately 2 nm; the spacing b of the peak wavelength is 10 nm or less and more specifically is approximately 5 nm.

In addition, a maximum wavelength bandwidth c of each monochromatic irradiation light Li is preferably, for example, 30 nm or less and is approximately 4 nm in the present embodiment.

With regard to the plurality of monochromatic irradiation lights Li, the maximum wavelength bandwidth c and the spacing b of the peak wavelengths are set such that b>c, and thereby monochromatic irradiation lights Li of the same wavelength are not included.

In addition, the light intensities of the monochromatic irradiation lights Li radiated onto the samples s are 0.1-150 $\mu mols^{-1}m^{-2}$. The light intensities of the plurality of monochromatic irradiation lights Li are substantially equal to one another. That is, the light intensities of the monochromatic irradiation lights Li are set, as appropriate, to a prescribed value within the above-mentioned range and are set such that the light intensities among the plurality of monochromatic irradiation lights Li are substantially equal to one another.

When using the multiwavelength-light-radiating apparatus 1, for example, the same amount of the same sample s is placed in each of the numerous wells 31 of the sample-placement part 3. Furthermore, the monochromatic irradiation lights Li, whose wavelengths differ from one another, are radiated simultaneously from the optical fibers 2 onto the samples s. Other than the wavelengths of the monochromatic irradiation lights Li to be radiated, the monochromatic irradiation lights Li can be radiated under the same conditions.

The multiwavelength-light-radiating apparatus 1 can be used in, for example, action spectrum analysis in optogenetics. In this case, for example, cells of an organism are placed in each well 31 of the sample-placement part 3 as the samples s. Then, as described above, monochromatic irradiation lights Li of differing wavelengths are respectively radiated simultaneously onto the samples s of each of the wells 31, and the biological reactions of the cells are observed. Thereby, the wavelength dependency of the physiological responses of the cells to light is investigated.

Next, the functions and effects of the present embodiment will be explained.

The multiwavelength-light-radiating apparatus 1 comprises the light source 11, the diffracting part 12, the numerous optical fibers 2, and the sample-placement part 3. Thereby, the numerous monochromatic lights Lm resulting from diffraction by the diffracting part 12 can be guided, by the numerous optical fibers 2, individually to the numerous wells 31 of the sample-placement part 3 and radiated as the monochromatic irradiation lights Li. Consequently, an apparatus that can radiate the numerous monochromatic irradiation lights Li simultaneously onto the numerous samples s, each light onto its corresponding sample, without using particularly large-size equipment, can be implemented at low cost.

In addition, because a light source that radiates continuous light Lc is used as the light source 11 and that continuous light Lc is diffracted by the diffracting part 12, the wavelength resolving power of the monochromatic irradiation lights Li can be easily increased.

In addition, the full width at half maximum a of the monochromatic irradiation lights Li is 20 nm or less; and in the present embodiment in particular, the full width at half maximum a is 5 nm or less. Thereby, wavelength purity and wavelength resolving power can be increased, and the numerous monochromatic irradiation lights Li, which are of finely resolved wavelengths, can be obtained with high purity. Thereby, for example, the action spectrum analysis described above can be performed more effectively using the multiwavelength-light-radiating apparatus 1.

In addition, the spacing of the peak wavelengths of the numerous monochromatic irradiation lights Li is 20 nm or less. Thereby, the numerous monochromatic irradiation lights Li, which are of finely resolved wavelengths, can be obtained efficiently. Thereby, by using the multiwavelength-light-radiating apparatus 1, for example, the action spectrum analysis described above can be performed more effectively.

In addition, the light source 11 radiates continuous light Lc that includes the entire visible light region. Furthermore, at least some of the numerous monochromatic irradiation lights Li are monochromatic lights in the visible light region. Thereby, the multiwavelength-light-radiating apparatus 1 can be suitably used in action spectrum analysis in optogenetics, which was described above.

In addition, the adjusting filters 51 are provided interposed between the output ends 22 of the optical waveguides 2 and the wells 31. Therefore, the light intensities of the monochromatic irradiation lights Li that are radiated onto the numerous samples s can be adjusted. Thereby, adjustments can be made such as uniformizing, among the samples s, light irradiation conditions apart from wavelength, such as the light intensity itself or the energy per unit of time.

In addition, the multiwavelength-light-radiating apparatus 1 comprises the positioning member 4. Thereby, radiating the monochromatic irradiation lights Li reliably onto the samples s in the numerous wells 31 of the sample-placement part 3 can be made easy to perform.

In addition, the positioning member 4 comprises the light-shielding parts 43. Thereby, a single monochromatic irradiation light Li can be reliably radiated onto the sample s disposed in a single well 31.

In addition, the sample-placement part 3 is configured such that the monochromatic irradiation light Li radiated onto each well 31 does not leak into other wells. Thereby, it is possible to reliably prevent the monochromatic irradiation light Li radiated onto each well 31 from affecting samples disposed in different wells 31.

In addition, the numerous optical fibers 2 are arranged such that the incident ends 21 are arrayed in one row in a straight line, and the output ends 22 are arrayed in a plurality of rows. Thereby, each monochromatic light Lm, resulting from diffraction in the diffracting part 12, can easily impinge its corresponding optical fiber 2, and the monochromatic irradiation lights Li can be emitted as an array having a plurality of rows. Thereby, the numerous wells 31 of the sample-placement part 3 can be disposed in a plurality of rows, as shown in FIG. 5.

In addition, the light intensities of the monochromatic irradiation lights Li are 0.1-150 $\mu mols^{-1}m^{-2}$. Thereby, the monochromatic irradiation lights Li can be radiated onto the samples s with sufficient light intensities.

According to the above-mentioned embodiment as described above, the small-size multiwavelength-light-radiating apparatus can be provided at low cost.

Second Embodiment

Figure 9:
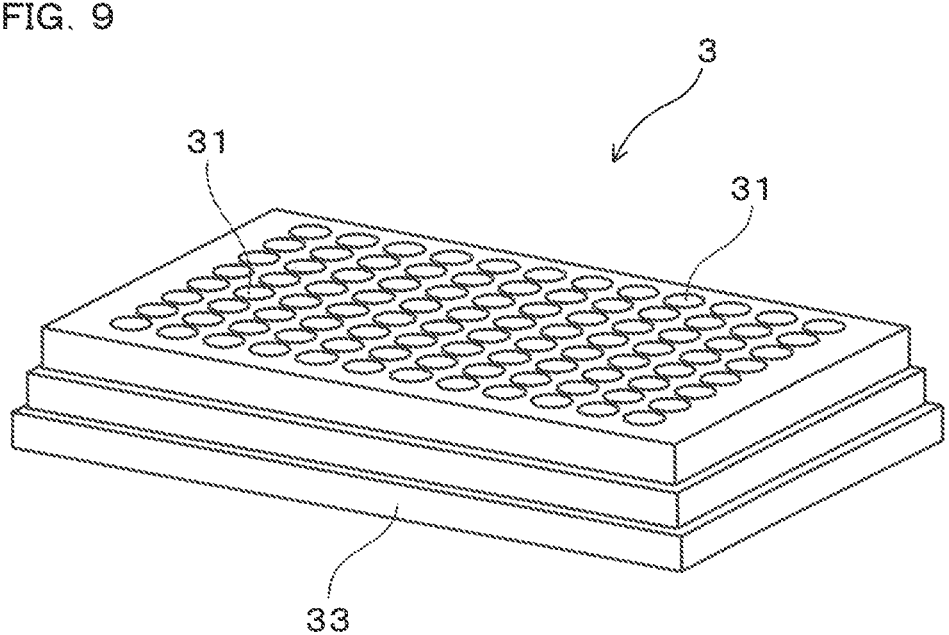
FIG. 9 is an oblique view of the sample-placement part, which comprises a temperature-adjusting part, of a second embodiment.

As shown in FIG. 9, in the multiwavelength-light-radiating apparatus 1 of the present embodiment, the sample-placement part 3 comprises a temperature-adjusting part 33 for adjusting the temperature of the samples s inside the wells 31.

The temperature-adjusting part 33 is disposed on a lower side of the sample-placement part 3. Furthermore, it is configured so that the temperature of the samples s inside the numerous wells 31 can be equalized. The temperature-adjusting part 33 can be configured as one that comprises, for example, a thermoelectric heater, a Peltier device, or the like.

Other structural elements are the same as in the first embodiment. It is noted that those symbols used in the second embodiment and onward that are identical to the symbols used in the previously recited embodiment indicate, unless otherwise specified, structural elements that are the same as those in the previously recited embodiment.

In the present embodiment, the monochromatic irradiation lights Li can be radiated while the temperature of the samples s is being adjusted. For example, this is effective if there is a need to set the same temperature condition for all the samples s, such as the case in which action spectrum analysis in optogenetics is performed using the multiwavelength-light-radiating apparatus 1.

In addition, the present embodiment has the same functions and effects as in the first embodiment.

Third Embodiment

The present embodiment is an embodiment in which temperature adjustment of the samples placed on the sample-placement part 3 is performed using, as the temperature-adjusting part, one that has a housing space that can be maintained at a prescribed temperature.

That is, the sample-placement part 3 on which the numerous samples are placed is housed inside the housing space. The interior of the housing space is a heat-insulating structure that is isolated from external air and that can inhibit the effect of the external-air temperature. Furthermore, the interior of the housing space is adjusted to a prescribed temperature using a temperature-adjusting means such as a Peltier device.

The light source 11, the diffracting part 12, and the like are disposed outside of the housing space, and the samples are disposed inside the housing space. Consequently, the optical fibers 2 are disposed such that they are inserted through the interior and the exterior of the housing space. At this time, to prevent the transfer of heat between the external air and the interior of the housing space via through parts of the optical fibers 2 in the housing space, the through parts are also heat insulated. In such a configuration, the lights are radiated onto the samples inside the housing space via the optical fibers 2 while the prescribed temperature inside the housing space is maintained.

For example, an incubator can be used as the temperature-adjusting part that has the housing space as described above. As an example of the incubator, there is the compact cool incubator ICI1 (made by AS ONE Corporation).

This incubator is a cool incubator that adjusts the temperature inside the housing space using a Peltier device. A small-size fan is provided inside the housing space, and a forced-convection system is used that can circulate the air inside the chamber. In addition, this incubator is configured such that the temperature is adjusted using PID control. Thereby, the temperature of the samples can be adjusted with high thermoregulation accuracy.

When the incubator is used in the multiwavelength-light-radiating apparatus, the following configuration is conceivable as a configuration in which, as described above, the optical fibers 2 are inserted through the interior and the exterior of the housing space. That is, openings are provided in an upper surface of the housing space of the incubator. These openings are covered by a lamination of resin-foam sheets and rubber sheets. Holes, through which the numerous optical fibers are inserted, are formed in the laminated body, and the numerous optical fibers 2 are inserted through the holes. Thereby, the tip parts of the optical fibers 2 can be disposed in the housing space of the incubator while maintaining the heat insulation of the housing space of the incubator.

In actuality, when using the above-mentioned compact cool incubator ICI1, temperature adjustment was performed in the state in which the sample-placement part 3, in which the samples were placed, was disposed in the housing space, as described in the first embodiment. That is, in this state, set temperatures were set to 26° C. and 37° C., respectively, and held for three hours, and the temperature of the housing space was measured every hour. As a result, it was confirmed that, for each of the above-mentioned temperature settings, the temperature of the housing space (i.e., the temperature of the samples) was maintained within the range of the set temperatures±0.2° C.

It is noted that the temperature inside the housing space was measured at the temperature settings of 12° C. and 45° C. without the placement of the samples. As a result, it was confirmed that the temperature was maintained within the range of the set temperatures±0.2° C.

The present invention is not limited to the above-mentioned embodiments and can be applied to various embodiments within a scope that does not deviate from the gist of the present invention. For example, the above-mentioned embodiments are obtained by the multiwavelength-light-radiating apparatus 1 and describe one in which the number of the monochromatic irradiation lights Li, whose wavelengths differ from one another, is 96; however, the number of the monochromatic irradiation lights Li is not limited thereto.

In addition, the application of the multiwavelength-light-radiating apparatus is not necessarily limited to action spectrum analysis in optogenetics as described above. In addition, other than cells of organisms, it is also possible to use, as the samples to be irradiated by the monochromatic irradiation lights, for example, a chemical substance that has absorption in the irradiation-light region, a material to be evaluated for stability with respect to the light irradiation, or the like. Furthermore, it is also assumed that the wavelength dependency of the reaction when the light is radiated thereto will be investigated.

The invention claimed is:

1. A multiwavelength-light-radiating apparatus used for action spectrum analysis to investigate wavelength dependence of responses of samples irradiated with monochromatic lights, comprising:
    a light source that radiates continuous light;
    a diffracting part that diffracts the continuous light into numerous monochromatic lights, whose wavelengths differ from one another, and emits the monochromatic lights;
    numerous optical waveguides that respectively receive the monochromatic lights emitted from the diffracting part at incident ends of the optical waveguides and emit the monochromatic lights from output ends; and
    a sample-placement part configured to individually hold numerous samples so as to be simultaneously and individually irradiated by the respective monochromatic lights emitted from the output ends of the optical waveguides; and adjusting filters that adjust the light intensities of the monochromatic irradiation lights; wherein: the adjusting filters are respectively interposed between the output ends of the optical waveguides and the sample-placement part; and adjusting filters individually adjust the light intensities of the monochromatic lights radiated onto each of the numerous samples, so that a light irradiation condition, other than wavelength, of the monochromatic lights radiated onto each of the numerous samples is uniformized among said numerous samples.

2. The multiwavelength-light-radiating apparatus according to claim 1, wherein the monochromatic lights each have a full width at half maximum of 20 nm or less.

3. The multiwavelength-light-radiating apparatus according to claim 1, wherein a spacing between peak wavelengths of the numerous monochromatic lights is 20 nm or less.

4. The multiwavelength-light-radiating apparatus according to claim 1, wherein:
the light source is configured to radiate continuous light that includes at least a portion of the visible light region; and
at least some of the numerous monochromatic lights are monochromatic lights in the visible light region.

5. The multiwavelength-light-radiating apparatus according to claim 4, wherein the light source is configured to radiate continuous light that includes the entire visible light region.

6. The multiwavelength-light-radiating apparatus according to claim 1, wherein the sample-placement part comprises numerous wells, which are arrayed opposing the output ends of the optical waveguides, such that each well respectively opposes one of the output ends via one of the adjusting filters, and is configured such that the numerous monochromatic lights, whose wavelengths differ from one another, are radiated simultaneously onto the samples, such that each of the lights is respectively radiated onto each one of the samples placed in the numerous wells.

7. The multiwavelength-light-radiating apparatus according to claim 6, further comprising a positioning member that holds the numerous optical waveguides in the vicinity of the output ends and positions the output ends and the wells.

8. The multiwavelength-light-radiating apparatus according to claim 7, wherein the positioning member comprises light-shielding parts that inhibit intermixing of the plurality of monochromatic lights emitted from the plurality of output ends.

9. The multiwavelength-light-radiating apparatus according to claim 6, wherein the sample-placement part is configured to inhibit leakage of the monochromatic light radiated onto each of the respective wells into adjacent wells.

10. The multiwavelength-light-radiating apparatus according to claim 6, wherein the sample-placement part comprises a temperature-adjusting part for adjusting the temperature of the samples inside the wells.

11. The multiwavelength-light-radiating apparatus according to claim 1, wherein the monochromatic lights are emitted at light intensities of 0.1-150 $\mu mols^{-1}m^{-2}$.

12. The multiwavelength-light-radiating apparatus according to claim 1, wherein the numerous optical waveguides are disposed such that the incident ends are arrayed in one row in a straight line and the output ends are arrayed in a plurality of rows.

13. The multiwavelength-light-radiating apparatus according to claim 1, wherein the optical waveguides are each composed of optical fibers.

14. A multiwavelength-light-radiating apparatus, comprising:
a light source that radiates continuous light;
a diffracting part configured to diffract the continuous light into at least five discrete wavelength ranges that each have a full width at half maximum of 20 nm or less;
a sample holder having at least five wells for holding samples;
at least five optical waveguides that respectively transmit the at least five discrete wavelength ranges from the diffracting part to the sample holder such that the at least five wells are respectively irradiated with the at least five discrete wavelength ranges at the same time; and
at least five optical filters respectively interposed between output ends of the at least five optical waveguides and the at least five wells, the at least five optical filters respectively attenuating the at least five discrete wavelength ranges such that a light irradiation condition other than wavelength of the at least five discrete wavelength ranges is at least substantially equalized.

15. The multiwavelength-light-radiating apparatus according to claim 14, wherein:
the light irradiation condition other than wavelength of the at least five discrete wavelength ranges is light intensities of each of the at least five discrete wavelength ranges; and
respective peak wavelengths of the at least five discrete wavelength ranges are separated by 20 nm or less.

16. The multiwavelength-light-radiating apparatus according to claim 15, wherein:
the optical waveguides are respectively composed of optical fibers; and
the optical fibers are disposed such that the incident ends of the optical fibers that receive the at least five discrete wavelength ranges from the diffracting part are arrayed along one straight line and the output ends are arrayed in a plurality of rows.

17. The multiwavelength-light-radiating apparatus according to claim 16, further comprising:
a positioning member that holds the output ends of the optical fibers and positions the output ends relative to the at least five wells;
wherein the positioning member comprises light-shielding parts that inhibit intermixing of the at least five discrete wavelength ranges.

18. The multiwavelength-light-radiating apparatus according to claim 17, wherein:
the at least five discrete wavelength ranges are at least twenty discrete wavelength ranges that each have a full width at half maximum of 5 nm or less;
the respective peak wavelengths of the at least twenty discrete wavelength ranges are separated by 5 nm or less;
the continuous light includes at least a portion of wavelengths in a range of 300-800 nm;
the output ends of at least twenty optical fibers are arrayed in a plurality of rows;
the sample holder has at least twenty wells for holding samples and the at least twenty wells are arrayed in the same number of rows as the output ends of the at least twenty optical fibers; and
an incubator is configured to hold the sample holder at a temperature setting between 12-45° C.

* * * * *